July 10, 1956

R. B. KOGER ET AL 2,754,078

BOTTLE HOLDER

Filed Dec. 5, 1951

Richard B. Koger
Daniel A. McGinnis
INVENTORS

BY
Attorneys

United States Patent Office 2,754,078
Patented July 10, 1956

2,754,078

BOTTLE HOLDER

Richard B. Koger, Joplin, Mo., and Daniel A. McGinnis, Coffeyville, Kans.

Application December 5, 1951, Serial No. 259,944

1 Claim. (Cl. 248—311)

This invention relates generally to bottle holders, and more particularly to a bottle holder especially designed for attachment to the interior of a vehicle.

The primary object of this invention is to provide an improved bottle holder adapted to be secured to the interior of a vehicle as a permanent attachment.

Another object of this invention is to provide an improved bottle holder having means for engaging beneath and behind a window trim molding of a vehicle.

Another object of this invention is to provide an improved bottle holder for use in the interior of a vehicle, said bottle holder being of simple construction and economically manufactured.

A further object of this invention is to provide an improved bottle holder in which the bottle supporting portions may be folded to lie flat against the inner side wall of a vehicle.

A still further object of this invention is to provide an improved bottle holder which in its folded position has a pleasing and ornamental appearance.

These, together with various ancillary features and objects of the invention, which will later become apparent as the following description proceeds are obtained by the present invention, a preferred embodiment of which has been illustrated by way of example only in the accompanying drawings, wherein.

Figure 1:
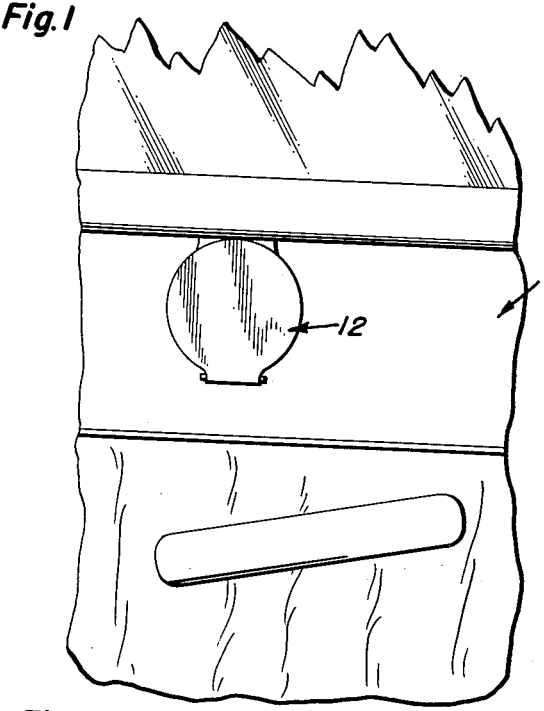
Figure 1 is a front elevational view of the improved bottle holder, which is the subject of this invention, the bottle holder being illustrated in its folded condition and shown connected to the interior wall of a conventional automobile, only a portion of the automobile being illustrated.

Referring now more specifically to the accompanying drawings, wherein like numerals designate similar parts throughout the various views, it will be seen that the novel bottle holder of this invention is shown in Figure 1 as being applied to the interior wall of a conventional automobile which will be referred to hereinafter by the reference numeral 10. The improved bottle holder, which is the subject of this invention, will be referred to hereinafter by the reference numeral 12, and may be made of metal, plastic, or of other suitable material.

Figure 3:
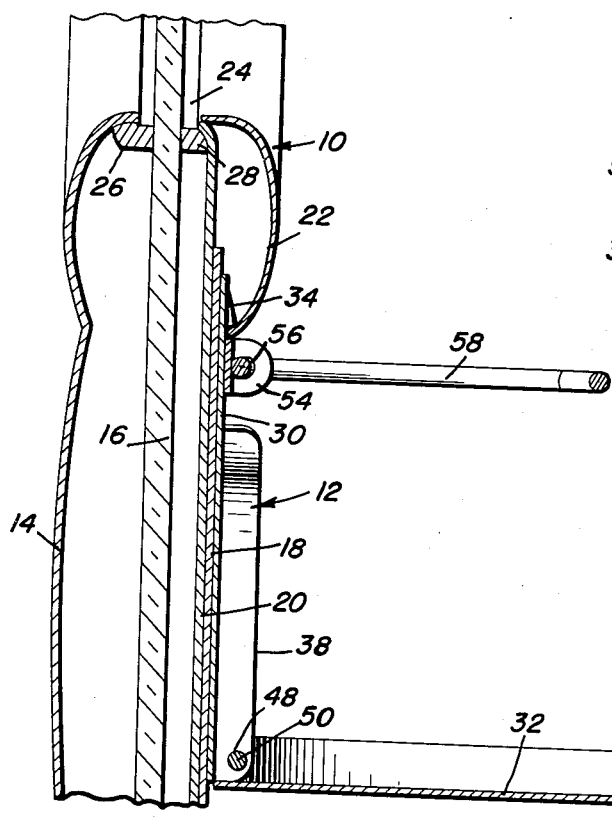
Figure 3 is an enlarged partial transverse vertical sectional view through a side wall of a vehicle in the vicinity of a window, and showing the improved bottle holder being attached thereto, the bottle holder being shown in its opened condition.
Figure 4:
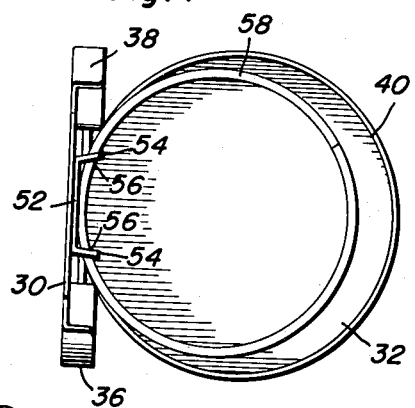
Figure 4 is a top plan view of the bottle holder in its opened bottle receiving condition.

Referring now to Figure 3 in particular, it will be seen that the automobile 10 in the vicinity of the point of attachment of the bottle holder 12 to the automobile 10 includes a portion of the metal body 14 having mounted therein a window 16. The interior of the automobile 10 is provided with a trim panel 18 which is secured to a cardboard backing 20. Overlying the trim panel 18 and its cardboard backing 20 is a metal trim molding 22 disposed around a window opening 24. The window opening 24 is provided with conventional weather stripping 26 and 28.

Figure 2:
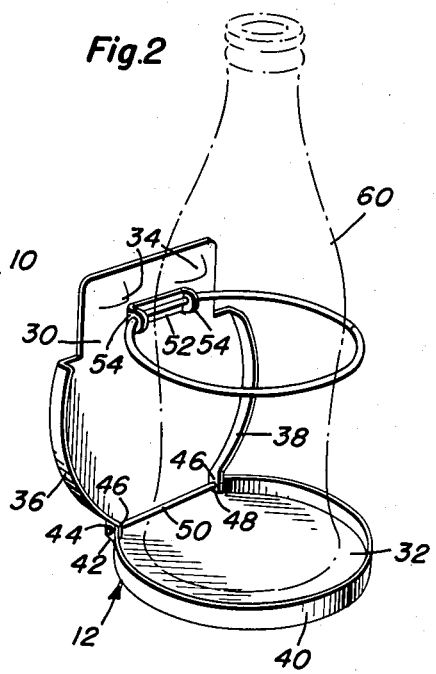
Figure 2 is an enlarged perspective view of the improved bottle holder, the bottle holder being shown in its opened bottle receiving condition, a bottle being shown supported by the bottle holder in dotted lines.

Referring now to Figure 2 in particular, it will be seen that the bottle holder 12, which is the subject of this invention, consists of a wall engaging portion 30 and a bottle supporting portion 32. The upper portion of the wall engaging portion 30 is substantially rectangular and has struck therefrom a plurality of struck out resilient tabs 34. The central portion of the wall engaging portion 30 has the general shape of a double truncated circle, and the lower portion thereof has the shape of a long narrow rectangle. The side edges of the intermediate and lower portions of the wall engaging portion 30 are provided with upstanding flanges 36 and 38.

The bottle supporting portion 32 is substantially circular in plan view and is provided with a long narrow rectangular extension at its lower end. The bottle supporting portion 32 is provided with a peripheral flange 40 which extends along the periphery thereof with the exception of the lower edge of the rectangular extension. The flat parallel portions 42 of the peripheral flange 40 secured to the side edges of the rectangular extension portion are provided with aligned apertures 44. The edge flanges of the wall engaging portion 30 terminate in flat parallel portions 46 which are provided with aligned apertures 48. A pivot pin 50 extends through the aligned apertures 44 and 48 to pivotally secure the wall engaging portion 30 to the bottle supporting portion 32.

The bottle engaging portion 32 is pivoted to its bottle receiving position normal to the surface of the wall engaging portion 30, the end edges of the flange portions 46 of the wall engaging portion 30 engage the upper surface of the bottle supporting portion, and prevent further downward pivoting of the bottle supporting portion 32. The lower outer corners of the flange portions 46 are rounded to permit upward pivoting of the bottle supporting portion 32 about the pivot rod 50. Secured to the upper rectangular portion of the wall engaging portion 30 below the struck out tabs 34 is a U-shaped mounting bracket having a web 52 and flanges 54. The web 52 is secured to the wall engaging portion 30 in any conventional manner. The flanges 54 are provided with aligned apertures 56 through which is passed a circular ring 58. The ring 58 is normally disposed parallel to the wall engaging portion 30, but may be pivoted to a position normal thereto to form a stabilizing ring for a bottle supported by the bottle supporting portion 32. The apertures 56 are closely adjacent the web 52 of the support for the ring 58, and when the ring 58 is moved to a position normal to the wall engaging portion 30, the portion of the ring between the flanges 54 engages the web 52 and is flattened thereby. The flattening of a portion of the ring 58 against the web 52 rigidly secures the ring 58 in a position normal to the wall engaging portion 30.

The diameter of the circular portion of the bottle supporting portion 32 is slightly greater than the diameter of the intermediate circular portion of the wall engaging portion 30 so that the bottle supporting portion 32 may be folded to a position overlying the wall engaging portion 30. The bottle engaging portion 32, in its position overlying the wall engaging portion, also overlies the ring 58 and its support and conceals the same. The peripheral flange 40 of the bottle supporting portion 32 engages the flange portions 36 and 38 of the wall supporting portion 30 and thereby retains the bottle supporting portion 32 in its position overlying the wall engaging portion 30.

Referring now to Figure 2 in particular, it will be seen that when the bottle holder 12 is in its open position, that the bottle 60 shown in dotted lines, rests on the upper surface of the bottle supporting portion 32 and is prevented from tipping by the ring 58.

From the foregoing, the construction and operation of the bottle holder will be readily understood, and further explanation is believed to be unnecessary. However, since numerous modifications and changes will readily occur to those skilled in the art after a consideration of the foregoing specification and accompanying drawings, it is not desired to limit the invention to the exact construction shown and described, nor is it desired to limit the invention to a bottle holder for vehicles as it may be secured to other wall surfaces, and accordingly all suitable modifications and equivalents may be resorted to, falling within the scope of the appended claim.

Having described the invention, what is claimed as new is:

A bottle holder comprising a wall engaging portion and a bottle supporting portion, said bottle supporting portion pivotally secured to said wall engaging portion, a bottle stabilizing ring carried by said wall engaging portion in vertical spaced relation to said bottle supporting portion, said bottle stabilizing ring being carried by two flanges on said wall engaging portion, said ring passing through apertures in said flanges, said apertures being closely adjacent said wall engaging portion for said flanges, whereby a portion of said stabilizing ring engages said wall engaging portion when the ring is pivoted to a position normal to said wall engaging portion and said portion of the ring is flattened out to retain the ring in its bottle stabilizing position.

References Cited in the file of this patent

UNITED STATES PATENTS

| | | |
|---|---|---|
| 820,708 | Durfey | May 15, 1906 |
| 851,577 | Weaver | Apr. 23, 1907 |
| 1,328,271 | Dutemple | Jan. 20, 1920 |
| 1,646,562 | Snow | Oct. 25, 1927 |
| 1,662,422 | Hodges | Mar. 13, 1928 |
| 1,912,350 | Gilbert | May 30, 1933 |
| 2,273,492 | Malmer | Feb. 17, 1942 |
| 2,279,442 | Burns et al. | Apr. 14, 1942 |
| 2,500,881 | Stader | Mar. 14, 1950 |
| 2,532,244 | Pasmore | Nov. 28, 1950 |
| 2,649,270 | Franks | Aug. 18, 1953 |

FOREIGN PATENTS

| | | |
|---|---|---|
| 202,193 | Switzerland | of 1939 |